United States Patent
Hong et al.

(10) Patent No.: US 8,126,594 B2
(45) Date of Patent: Feb. 28, 2012

(54) METHOD OF GENERATING A WALKING PATTERN FOR A HUMANOID ROBOT

(75) Inventors: Seok Min Hong, Daegu (KR); Yong Hwan Oh, Seoul (KR); Young Hwan Chang, Seoul (KR); Do Ik Kim, Seoul (KR); Bum Jae You, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 576 days.

(21) Appl. No.: 12/260,173

(22) Filed: Oct. 29, 2008

(65) Prior Publication Data
US 2009/0271037 A1 Oct. 29, 2009

(30) Foreign Application Priority Data

Apr. 29, 2008 (KR) .................. 10-2008-0039687

(51) Int. Cl.
*G05B 19/04* (2006.01)
*G05B 19/18* (2006.01)
(52) U.S. Cl. .................. 700/253; 700/245; 318/568.12; 318/568.17; 318/568.2
(58) Field of Classification Search .................. 700/245, 700/253; 318/568.12, 568.17, 568.19, 568.2; 901/1
See application file for complete search history.

(56) References Cited

U.S. PATENT DOCUMENTS

| | | | |
|---|---|---|---|
| 5,357,433 A | | 10/1994 | Takenaka |
| 6,301,524 B1 * | | 10/2001 | Takenaka .................. 700/245 |
| 6,802,382 B2 * | | 10/2004 | Hattori et al. .................. 180/8.6 |
| 6,832,132 B2 * | | 12/2004 | Ishida et al. .................. 700/245 |
| 2005/0267630 A1 | | 12/2005 | Kajita |

FOREIGN PATENT DOCUMENTS

| JP | 05-318340 A | 12/1993 |
|---|---|---|
| JP | 2004-114243 A | 4/2004 |

OTHER PUBLICATIONS

Choi et al., On the Stability of Indirect ZMP Controller for Biped Robot Systems, 2004, Proceedings of 2004 IEEE/RSJ International Conference on Intelligent Robots and Systems Sep. 28-Oct. 2, 2004, Sendai, Japan, pp. 1966-1971.*

(Continued)

*Primary Examiner* — Khoi Tran
*Assistant Examiner* — Jamie Figueroa
(74) *Attorney, Agent, or Firm* — NSIP Law (57) ABSTRACT

The present invention may provide a method of generating a walking pattern for a humanoid robot. The method of generating the walking pattern for the humanoid includes determining a position of a next Zero Moment Point (ZMP) along a moving direction of the humanoid robot, obtaining a first condition for generating a walking pattern based on the determined ZMP by using a periodic step module, generating trajectories of a ZMP and a Center of Mass (CoM) in an initial step based on the first condition and an initial value obtained from an initial state of the humanoid robot by using a transient step module, generating trajectories of a ZMP and a CoM in a steady step based on the ZMP of two steps by using a steady step module, and generating trajectories of a ZMP and a CoM in a final step by using the transient step module.

22 Claims, 7 Drawing Sheets

OTHER PUBLICATIONS

Lim et al., Adaptive Gait Algorithm for IWR Biped Robot, 1995, IEEE catalogue No. 95 TH8025, Department of Industrial Automation, Inha University, Korea, pp. 438-443.*

Weiguo et al., Design Simulation and Walking Experiments for Humanoid and Gorilla Robot with Multiple Locomotion Modes, 2005, Proceedings of 2005 IEEE/RSJ International Conference on Intelligent Robots and Systems Aug. 2-6, 2005, Alberta, Canada, pp. 1157-1162 (1-6).*

Choi et al., Optimal Walking Trajectory Generation for a Biped Robot Using Genetic Algorithm, 1999, Proceedings of the 1999 IEEE/RSJ International Conference on Intelligent Robots and Systems Oct. 17-21, 1999, Kyongju, Korea, pp. 1456-1461 (1-6).*

Zhang et al., A new method of desired gait synthesis in biped robot, 2000, Proceedings of the 3rd World Congress on Intelligent Control and Automation, Jun. 28-Jul. 2, 2000, Hefei, China, pp. 1300-1304 (1-5).*

Kim et al., Landing Force Control for Humanoid Robot by Time-Domain Passivity Approach, 2007, IEEE Transaction on Robotics, Vo. 23, No. 6, Dec. 2007, pp. 1294-1301 (1-8).*

Hong et al., Walking pattern generation for Humanoid robots with LQR and feedforward control method, 2008, 34th Annual Conference of IEEE, Nov. 10-13, 2008, Orlando FL, pp. 1698-1703 (1-6).*

Oh et al., An Analytical Method to Generate Walking Pattern of Humanoid Robot, 2006, 32nd Annual Conference on IEEE Industrial Electronics IECON 2006, Nov. 2006, Paris, France, pp. 4159-4164 (1-6).*

Zhu et al., Bipedal walking pattern design based on synchronization of the motions in sagittal and lateral planes, 2005, IEEE/RSJ International Conference on Intelligent Robots and Systems, Aug. 2-6, 2005, Alberta, Canada, pp. 1-7.*

Azevedo et al., BIPedal walking—from gait design to experimental analysis, Jul. 2004, Mechatronics Journal, vol. 14, Issue 6, pp. 639-665.*

K. Harada, et al., "An Analytical Method on Real-time Gait Planning for a Humanoid Robot," IEEE-RAS/RAJ Int. Conf. on Humanoid Robot, Nov. 2004, pp. 640-655.

Shuuji Kajita, et al., "Biped Walking Pattern Generation by using Preview Control of Zero-Moment Point," Sep. 14, 2003, Proc. of IEEE Int. Conf. on Robotics & Automation, pp. 1620-1626, Taipei, Taiwan.

Chi Zhu, et al., "Biped Walking with Variable ZMP, Frictional Constraint, and Inverted Pendulum Model," Aug. 22, 2004, Proc. of IEEE Int. Conf on Robotics and Biomimetics. pp. 425-430, Shenyang, China.

Seokmin Hong, et al., "An Omni-directional Walking Pattern Generation Method for Humanoid Robots with Quartic Polynomials." Oct. 2007, Proc. of the 2007 IEEE/RSJ Int. Conf on Intelligent Robots and Systems, pp. 42074213, San Diego. Calif.

Korean Intellectual Property Office, Notice of Allowance, Sep. 17, 2010.

Seungchul Lim and Inhwan Ko, "Locomotions of a biped robot: static vs. dynamic gaits," Transactions of the Korean Society of Mechanical Engineers, vol. 30, issue 6, pp. 643-652, Jun. 2006.

Jaw-Won Kho, Dong-Cheol Lim, "Implementation of an intelligent controller for biped walking robot using genetic algorithm and learning control," Transactions of the Korean Institute of Electrical Engineers, vol. 55, No. 2, pp. 83-88, 2006.

* cited by examiner

METHOD OF GENERATING A WALKING PATTERN FOR A HUMANOID ROBOT

The present application claims priority to Korean Patent Application 10-2008-39687, filed Apr. 29, 2008, the subject matter of which is incorporated herein by reference.

BACKGROUND

1. Field

The present invention relates to a method of generating a walking pattern for a humanoid robot, and more particularly to a method of generating a walking pattern for a humanoid robot which can walk in an omnidirection and with different strides.

2. Background

A humanoid robot has been developed for human's convenience in the human environment. Researches on the humanoid robot have been done about balancing, walking pattern generation, motion generation, whole body cooperation and so on. In particular, many walking pattern generation methods have been developed to prevent a robot from tipping over. Such methods of generating a walking pattern for a humanoid robot may be generally classified into two groups.

First, there is a method using forward dynamics. This method uses a dynamic equation associated with each link and uses information of each link such that a humanoid robot operates while maintaining its upright posture. However, a humanoid robot requires at least twelve degrees of freedom in its two legs in order to accomplish a behavior similar to that of a human. Therefore, a problem exists in that considerable time is spent obtaining proper actions because it requires so much information on each joint and must solve a complex dynamic equation. Further, to generate stable action of a robot, the robot must perform its walk by changing its walking position.

Second, another method using a linear inverted pendulum model uses limited components such as the total angular momentum and a total Center of Mass ("CoM") which represent the total mass of a humanoid robot as a point mass. The linear inverted pendulum model simplifies the complex dynamic equation of a humanoid robot into a second-order differential equation to generate a walking pattern. This method uses a Zero Moment Point ("ZMP") and uses it as an index for evaluating the stability of a robot. It can allow the precise walk of a robot by positioning a ZMP within a supporting area made by a robot according to the walk of the robot and presetting the stability of a robot.

Many methods for generating a walking pattern using a linear inverted pendulum model are introduced in following papers: a paper entitled "An Analytical Method on Real-time Gait Planning for a Humanoid Robot" (K. Harada, S. Kajita, K. Kaneko and H. Hirukawa) published in the *IEEE-RAS/RAJ Int. Conf on Humanoid Robot*, pp. 640-655, 2004; a paper entitled "Biped Walking Pattern Generation by using Preview Control of Zero-Moment Point" (S. Kajita, F. Kanehiro, K. Kaneko, K. Fujiwara, K. Harada, K. Yokoi and H. Hirukawa) published in the *proc. of IEEE Int. conf. on Robotics & Automation*, pp. 1620-1626, 2003; and a paper entitled "Biped Walking with Variable ZMP, Frictional Constraint and Inverted Pendulum Model" (C. Zhu, Y. Tomizawa, X. Luo and A. Kawamura) published in the *pro. of IEEE Int. Conf of Robotics & Biomimetics*, pp. 425-430, 2004, etc. However, these methods must have the ZMP information for some time and generate the pattern by using them. Further, there is a problem in the case that the CoM or the ZMP has the initial value in an initial state and the final value in a stop state of a robot with their methods. It takes place many errors of a walking pattern.

SUMMARY OF THE INVENTION

In accordance with illustrative embodiments of the present invention, a method for generating a walking pattern for a humanoid robot is provided comprising determining a position of a next Zero Moment Point (ZMP) along a moving direction of the humanoid robot, obtaining a first condition for generating a walking pattern based on the determined ZMP by using a periodic step module, generating trajectories of a ZMP and a Center of Mass (CoM) in an initial step based on the first condition and an initial value obtained from an initial state of the humanoid robot by using a transient step module, generating trajectories of a ZMP and a CoM in a steady step based on two ZMPs by using a steady step module, and generating trajectories of a ZMP and a CoM in a final step by using the transient step module.

BRIEF DESCRIPTION OF THE DRAWINGS

Arrangements and embodiments may be described in detail with reference to the following drawings in which like reference numerals refer to like elements and wherein.

DETAILED DESCRIPTION OF THE PRESENT INVENTION

A detailed description may be provided with reference to the accompanying drawings. One of ordinary skill in the art may realize that the following description is illustrative only and is not in any way limiting. Other embodiments of the present invention may readily suggest themselves to such skilled persons having the benefit of this disclosure.

Figure 1:
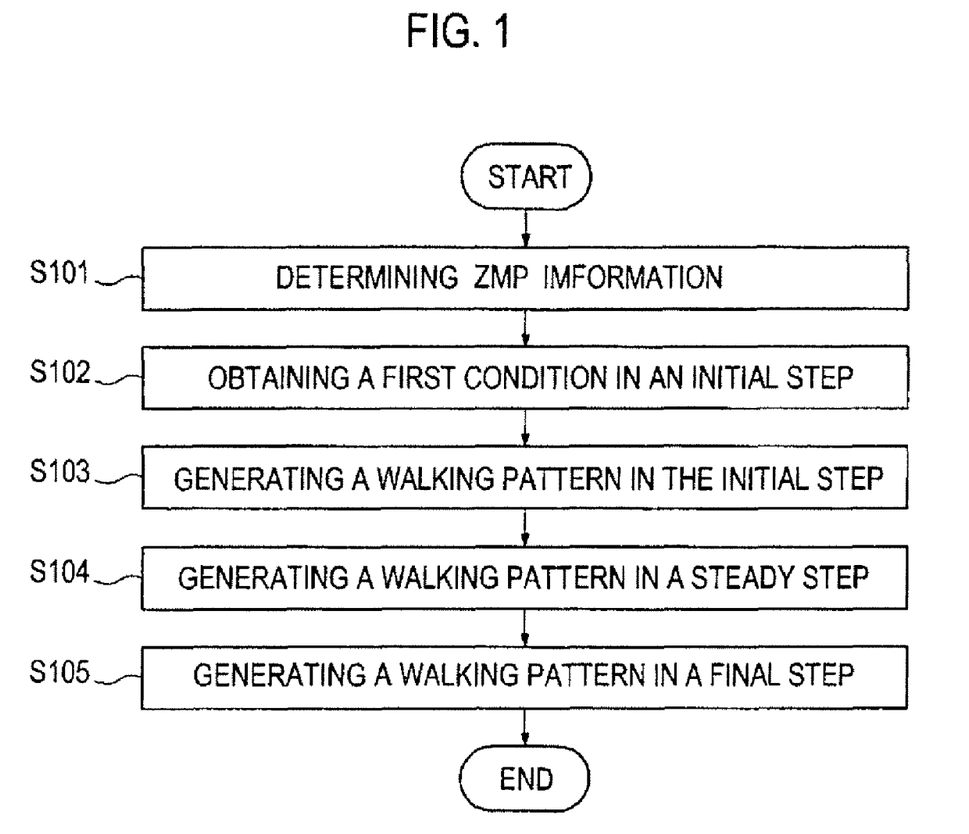
FIG. 1 is a flowchart showing a method of generating a walking pattern for a humanoid robot according to an illustrative embodiment.

FIG. 1 is a flowchart showing a method of generating a walking pattern for a humanoid robot according to an illustrative embodiment.

A method of generating a walking pattern for a humanoid robot 100 according to an illustrative embodiment includes the steps of determining a position of a next ZMP along a moving direction of the humanoid robot (step S101); obtaining a first condition for walking pattern generation based on the determined ZMP by using a periodic step module (step S102); generating trajectories of a ZMP and a CoM for an initial step based on the first condition and an initial value obtained from an initial state of the humanoid robot by using a transient step module (step S103); generating trajectories of a ZMP and a CoM for a steady step based on ZMPs of two steps by using a steady step module (step S104); and generating trajectories of a ZMP and a CoM for a final step by using the transient step module (step S105). The walking pattern for a humanoid robot is generated by generalizing these trajectories of the ZMP and the CoM.

The step S101 determines a position of a next ZMP, which the humanoid robot has along its moving direction. In other words, in this step, the position of the ZMP relating to a point for which the humanoid robot will head is determined. The ZMP is also used in the steady step module after this step. When a walking path of the humanoid robot is changeable omnidirectionaly, the ZMP is obtained by a user's input through a wire or wireless operator. Further, when a walking path of humanoid robot is unchangeable omnidirectionaly, the ZMP can be obtained from a pre-programmed device.

In the description, "a single supporting time" means a time interval wherein only one foot is supported on the ground and the other foot moves above the ground. "A double supporting time" means a time interval wherein both feet are supported on the ground. Further, "one period" means a time spent from the single supporting phase to a next single supporting phase or from the double supporting phase to a next double supporting phase.

In the description, "an initial step" means a walking motion during one period after the humanoid robot starts to walk, whereas "a final step" means a walking motion during one period just before the humanoid robot finishes walking. Further, "a steady step" means a remainder walking motion except the initial step and the final step.

In the description, "an initial state of the humanoid robot" means a state before walking of the humanoid robot. In this state, initial values of the ZMP and the CoM are used in the transient step module.

Figure 2:
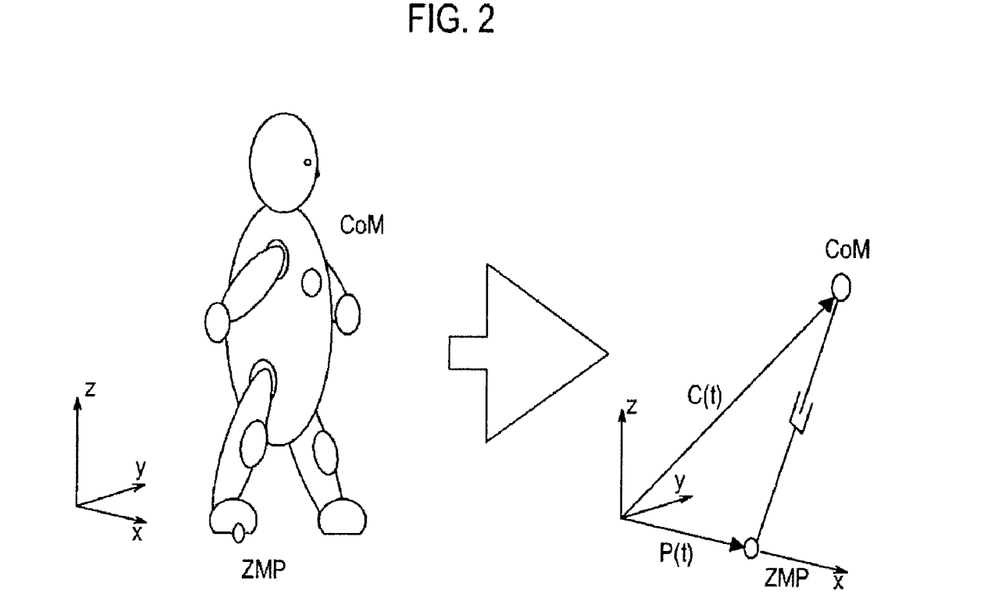
FIG. 2 is a conceptional view used in generating a walking pattern for a humanoid robot according to an illustrative embodiment.

FIG. 2 is a conceptional view used to generate a walking pattern for a humanoid robot according to an illustrative embodiment. Coordinates used herein are explained with reference to FIG. 2. An x-axis indicates the moving direction of the humanoid robot, while a y-axis and a z-axis refer to a lateral and a vertical direction of the humanoid robot, respectively. Equations used herein are described without distinction of the x-axis and the y-axis. Further, while a displacement is generally performed in the x-axis direction, displacement in the y-axis direction is also possible.

An inverted pendulum model obtains a total CoM equal to a total mass of the humanoid robot and simplifies a walking dynamic Equation into a dynamic Equation relating to a point mass by using the CoM. For simplicity introduced are some assumptions: the CoM moves around on the specified z-axis level and the time derivative of the angular momentum about the CoM is very low. Under these assumptions, a ZMP is an index indicating the stability of the humanoid robot. It is a point at which the dynamic reaction force produces no moment at the time of contact of the foot and the ground. In other words, it is a point wherein a sum of a total inertia force becomes 0. When using the inverted pendulum model, the relationship between the ZMP and the CoM can be represented in the following Equation 1:

$$p(t) = c(t) - \frac{z_{CoM} - z_{ZMP}}{g} \ddot{c}(t) \quad \text{[Equation 1]}$$
$$= c(t) - \frac{1}{\omega^2} \ddot{c}(t)$$

wherein p(t) is a position function of the ZMP, c(t) is a position function of the CoM, g is an acceleration of gravity, $z_{CoM}$ is a height constant of the CoM relative to the z-axis, $z_{ZMP}$ is a height constant of the ZMP relative to the z-axis, and $\omega$ is $$\sqrt{\frac{g}{z_{CoM} - z_{ZMP}}}.$$

Herein, the walking pattern in each of the supporting phases is generated based on the trajectories of the ZMP and the CoM. And, the trajectories of the ZMP and the CoM are generated by the using the Equation 1. It is needed to keep continuity of the jerk of the CoM position function for a smooth walking of the humanoid robot. As shown in Equation 1, the jerk of the CoM position function may have the continuity by assuring the continuity in the ZMP velocity function according to the relation between the ZMP and the CoM. Thus, the ZMP position function must be more than a cubic polynomial expression in order to satisfy the continuity of the position function and the velocity function of the ZMP and the CoM in each of the supporting phases. Herein, the ZMP position function is represented as a quartic polynomial expression in order to cope with various strides. However, it is understood that the ZMP position function may be represented as one other than a quartic polynomial expression.

The ZMP position function in the quartic polynomial expression may be represented as the following Equation 2:

$$p(t) = b_4 t^4 + b_3 t^3 + b_2 t^2 + b_1 t + b_0 \quad \text{[Equation 2]}$$

By applying the Equation 2 to the Equation 1 and solving the Equation 1, the following Equations 3 and 4 are obtained.

$$c(t) = \left(c(0) - b_0 - \frac{2}{\omega^2}b_2 - \frac{24}{\omega^4}b_4\right)\cosh(\omega t) + \quad \text{[Equation 3]}$$
$$\frac{1}{\omega}\left(\dot{c}(0) - b_1 - \frac{6}{\omega^2}b_3\right)\sinh(\omega t) + b_4 t^4 + b_3 t^3 +$$
$$\left(b_2 + \frac{12}{\omega^2}b_4\right)t^2 + \left(b_1 + \frac{6}{\omega^2}b_3\right)t + \left(b_0 + \frac{2}{\omega^2}b_2 + \frac{24}{\omega^4}b_4\right)$$

$$\dot{c}(t) = \omega\left(c(0) - b_0 - \frac{2}{\omega^2}b_2 - \frac{24}{\omega^4}b_4\right)\sinh(\omega t) + \quad \text{[Equation 4]}$$
$$\left(\dot{c}(0) - b_1 - \frac{6}{\omega^2}b_3\right)\cosh(\omega t) + 4b_4 t^3 +$$
$$3b_3 t^2 + 2\left(b_2 + \frac{12}{\omega^2}b_4\right)t + \left(b_1 + \frac{6}{\omega^2}b_3\right)$$

wherein c(0) indicates an initial value of the CoM position, and ċ(0) is an initial value of the CoM velocity.

In the Equations 2, 3 and 4, coefficients of the CoM position function and the CoM velocity function are represented as c(0), ċ(0) and coefficients of the ZMP position function. Therefore, it is very important to find the coefficients of the ZMP position function herein. In an i-th supporting time, the Equations 3 and 4 may be represented as following Equation 5:

$$X_i = A_i X_{i-1} + B_i \beta_i \quad \text{[Equation 5]}$$

wherein $$X_i = \begin{Bmatrix} \omega(c(T_i) - p(T_i)) \\ \dot{c}(T_i) \end{Bmatrix}$$

$$A_i = \begin{bmatrix} CT_i & ST_i \\ ST_i & CT_i \end{bmatrix}$$

$$B_i = \begin{bmatrix} -\frac{24}{\omega^2}CT_i + \frac{12}{\omega}T_i^2 + \frac{24}{\omega^3} & -\frac{24}{\omega^3}ST_i + 4T_i^3 + \frac{24}{\omega^2}T_i \\ -\frac{6}{\omega^2}ST_i + \frac{6}{\omega}T_i & -\frac{6}{\omega^2}CT_i + 3T_i^2 + \frac{6}{\omega^2} \\ -\frac{2}{\omega}CT_i + \frac{2}{\omega} & -\frac{2}{\omega}ST_i + 2T_i \\ -ST_i & -CT_i + 1 \end{bmatrix}^T$$

$$\beta_i = (b_{i4} \quad b_{i3} \quad b_{i2} \quad b_{i1})^T,$$

$T_i$ is the i-th supporting time,
$p(T_i)$ is the ZMP position function at $T_i$,
$c(T_i)$ and $\dot{c}(T_i)$ are the CoM position function and the CoM velocity function at $T_i$, respectively,
$CT_i$ and $ST_i$ indicate $\cos h\omega T_i$, $\sin h\omega T_i$, respectively, and $b_{in}$ (n=1, . . . , 4) indicates n-th coefficient of the ZMP position function at the i-th supporting phase.

The Equation 5 expresses the relationship between the ZMP position function and the CoM position function at i-th supporting phase. The Equation 5 is used as a basic equation when the periodic step module, the transient step module and the steady step module are executed at the steps S102, S103, S104 and S105.

The step S102 obtains a first condition for generating the walking pattern based on the ZMP by using the periodic step module.

Figure 3:
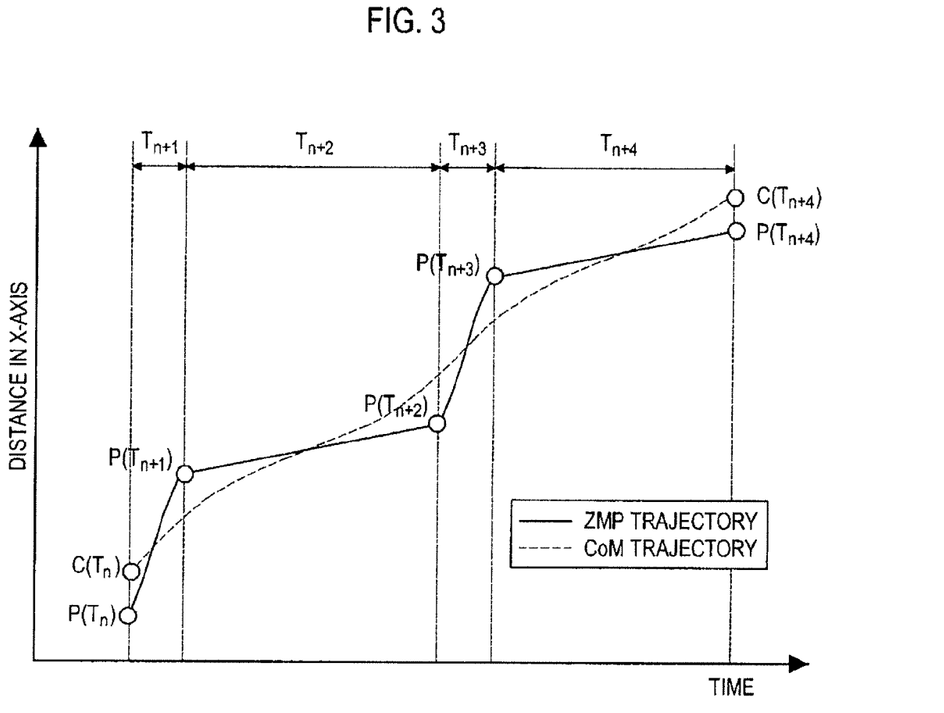
FIG. 3 is a graph showing trajectories of a ZMP and a CoM in a periodic step module used in an illustrative embodiment.

FIG. 3 is a graph showing trajectories of the ZMP and the CoM in the periodic step module used for an illustrative embodiment.

The periodic step module receives the next ZMP and outputs the CoM position and the CoM velocity by using a periodic characteristic of the trajectories. Herein, the CoM position and the CoM velocity indicate the first conditions. That is, the first conditions obtained in the periodic step module are used as a final value in the transient step module at the initial step, but is not used directly when the periodic step module generates the walking pattern. Since the periodic step module uses the periodic characteristic, it can not to generate the walking pattern having arbitrary directions and strides.

As shown in FIG. 3, the periodic step module uses four supporting phases. $T_{n+1}$ and $T_{n+3}$ indicate a double supporting time, and $T_{n+2}$ and $T_{n+4}$ are a single supporting time. The ZMP position function is represented as a cubic polynomial expression in the double supporting time, whereas the ZMP position function is represented as a linear polynomial expression in the single supporting time.

The coefficients of The ZMP position function which is the linear polynomial expression are as follows:

$$b_{i1} = \begin{cases} \frac{p(T_{n+4}) - p(T_{n+3})}{T_{n+4}} & \text{for } i = n+1, n+4 \\ \frac{p(T_{n+2}) - p(T_{n+1})}{T_{n+2}} & \text{for } i = n+2, n+3 \end{cases} \quad [\text{Equation 6}]$$

The periodic characteristic can be represented as a relationship between an initial value in the first supporting phase and a final value in the final supporting phase at each of the supporting phases, as following Equations 7 and 8:

$$\omega(c(T_{n+4}) - p(T_{n+4})) = \omega(c(T_n) - p(T_n)) \quad [\text{Equation 7}]$$

$$\dot{c}(T_{n+4}) = \dot{c}(T_n) \quad [\text{Equation 8}]$$

The ZMP position function in the single supporting phase is obtained by using the Equation 6 and the ZMP. The ZMP position function in the double supporting phase is obtained through an analytical method using eight equations including the Equations 7 and 8 and six equations satisfying the continuity among each supporting phase (e.g., two single supporting phases and two double supporting phases). Therefore, the CoM position function and CoM velocity function are obtained by using the ZMP position function.

The step S104 generates the trajectories of the ZMP and the CoM in various supporting phases by using the steady step module.

Figure 4:
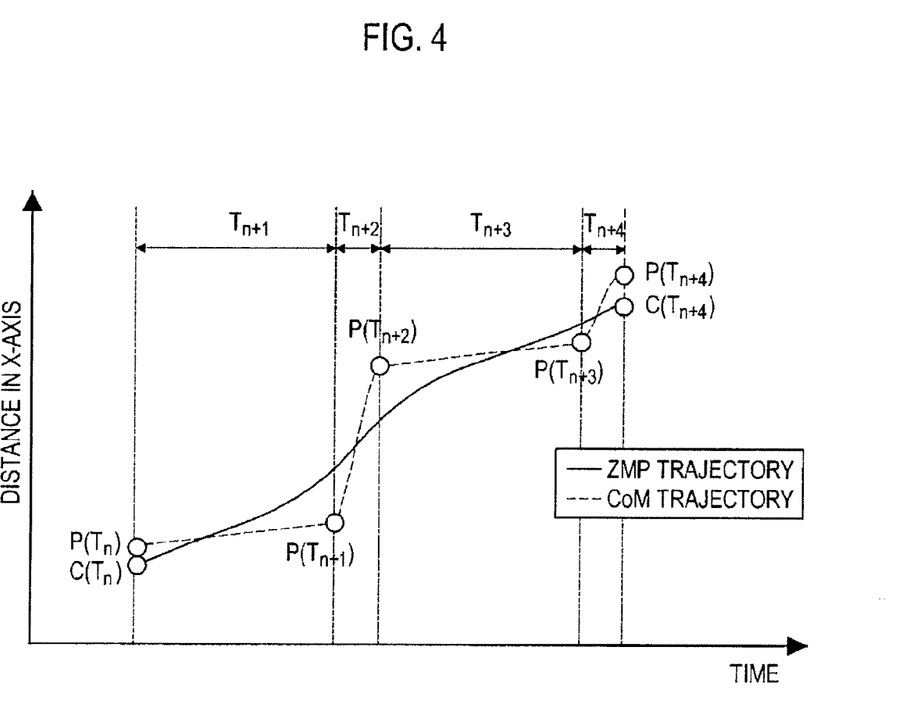
FIG. 4 is a graph showing trajectories of a ZMP and a CoM in a steady step module used in an illustrative embodiment.

FIG. 4 is a graph showing the trajectories of the ZMP and the CoM in the periodic step module used in an embodiment of the present invention.

The steady step module receives the ZMP, the ZMP velocity and the CoM position and velocity obtained by the previous step modules and finds the coefficients of the ZMP position function by using Equations 9 to 15, thereby generating the trajectories of the ZMP and the CoM in the steady step. As a result, the walking pattern of the humanoid robot is generated in the steady step.

As shown in FIG. 4, the steady step module uses four supporting phases. $T_{n+1}$ and $T_{n+3}$ indicates an single supporting times and $T_{n+2}$ and $T_{n+4}$ are an double supporting time. The reason why said four supporting phases are used is that there is a need to decrease the fluctuation of the ZMP trajectories caused by the variously planned ZMP. The ZMP position function can be represented as a quartic polynomial expression in the single and double supporting phase. In this case, the ZMP position function has redundancy variables to restrain the fluctuation of the ZMP trajectories by controlling the redundancy variables.

By using the Equation 5, a determinant about $T_n$ to $T_{+4}$ can be arranged as following Equation 9:

$$\kappa = \gamma^T_\tau \quad [\text{Equation 9}]$$

wherein $$\kappa = X_{n+4} - A_{n+4}A_{n+3}A_{n+2}A_{n+1}X_n$$

$$\gamma = \begin{bmatrix} (A_{n+4}A_{n+3}A_{n+2}B_{n+1})^T \\ (A_{n+4}A_{n+3}B_{n+2})^T \\ (A_{n+4}B_{n+3})^T \\ (B_{n+4})^T \end{bmatrix}$$

$$\tau = [\beta_{n+1}^T \quad \beta_{n+2}^T \quad \beta_{n+3}^T \quad \beta_{n+4}^T]^T$$

$$\beta_i = (b_{i1} \quad b_{i2} \quad b_{i3} \quad b_{i4})^T.$$

Nine second conditions, which satisfy the continuity of the ZMP and the ZMP velocity in each of the supporting phases and the Equation 9, are obtained as following Equation 10:

$$\phi = \Psi_T \quad [\text{Equation 10}]$$

wherein $$\varphi = \begin{Bmatrix} p(T_{n+1}) - p(T_n) \\ 0 \\ dp(T_n) \\ p(T_{n+2}) - p(T_{n+1}) \\ 0 \\ p(T_{n+3}) - p(T_{n+2}) \\ 0 \\ p(T_{n+4}) - p(T_{n+3}) \\ dp(T_{n+4}) \end{Bmatrix}$$

$$\Psi = \begin{bmatrix} F_{n+1} & 0 & 0 & 0 \\ G_{n+1} & -H & 0 & 0 \\ H & 0 & 0 & 0 \\ 0 & F_{n+2} & 0 & 0 \\ 0 & G_{n+2} & -H & 0 \\ 0 & 0 & F_{n+3} & 0 \\ 0 & 0 & G_{n+3} & -H \\ 0 & 0 & 0 & F_{n+4} \\ 0 & 0 & 0 & G_{n+4} \end{bmatrix}$$

$F_i = (T_i^4 \quad T_i^3 \quad T_i^2 \quad T_i)$ $G_i = (4T_i^3 \quad 3T_i^2 \quad 2T_i \quad 1)$ $H = (0 \quad 0 \quad 0 \quad 1)$.

The Equations 9 and 10 can be represented as following Equation 11:

$$\xi = \Phi\tau \qquad \text{[Equation 11]}$$

wherein $$\xi = \begin{Bmatrix} X_{n+4} - A_{n+4}A_{n+3}A_{n+2}A_{n+1}X_n \\ \varphi \end{Bmatrix}, \Phi = \begin{bmatrix} \gamma^T \\ \Psi \end{bmatrix}.$$

In each of the supporting phases, the coefficients of the ZMP position function are obtained by using the Equation 9 and a weighted least square method.

It will now be explained the weighted least square method and a least square method. When a function $f(x_i)$ and an approximation function $g(x_i)$ thereof are given with respect to $x_i$ (i=0, 1, 2, 3 ..., n), there are differences $g(x_i)-f(x_i)$ between the function $f(x_i)$ and the approximation function $g(x_i)$. The least square method is to find the approximation function $g(x_i)$ minimizing a summation S of the square of such differences as represented in following Equation 12:

$$S = \sum_{i=0}^{n} (q(x_i) - f(x_i))^2 \qquad \text{[Equation 12]}$$

When there is a great deal of error in the differences between the approximation function $g(x_i)$ and the function $f(x_i)$, the weighted least square method is to compensate for the error. Particularly, the weighted least square method finds the approximate function $g(x_i)$ minimizing a summation $S_\omega$ as represented in following Equation 13:

$$S_\omega = \sum_{i=0}^{n} w_i(q(x_i) - f(x_i))^2 \qquad \text{[Equation 13]}$$

The S and $S_\omega$ are called "a cost function" in the Equations 12 and 13.

Herein, the weighted least square method is employed to prevent the ZMP trajectories from fluctuating abruptly. That is, the ZMP trajectories becomes smooth by minimizing the fluctuation of the ZMP velocity P(t) Accordingly, when applying the Equation 13 to this embodiment, the cost function can be represented as following Equation 14.

$$\mathcal{J} = \frac{1}{2}\sum_{i=1}^{4} \int_0^{T_{n+i}} w_{n+i}[\dot{p}(t) - \alpha_{n+i}]^2 dt \qquad \text{[Equation 14]}$$

$$= \frac{1}{2}\tau^T W\tau - U\tau + c$$

wherein $$W = \begin{bmatrix} W_{n+1} & 0 & 0 & 0 \\ 0 & W_{n+2} & 0 & 0 \\ 0 & 0 & W_{n+3} & 0 \\ 0 & 0 & 0 & W_{n+4} \end{bmatrix}$$

$$W_i = w_i \begin{bmatrix} \frac{16}{7}T_i^7 & 2T_i^6 & \frac{8}{5}T_i^5 & T_i^4 \\ 2T_i^6 & \frac{9}{5}T_i^5 & \frac{3}{2}T_i^4 & T_i^3 \\ \frac{8}{5}T_i^5 & \frac{3}{2}T_i^4 & \frac{3}{2}T_i^3 & T_i^2 \\ T_i^4 & T_i^3 & T_i^2 & T_i \end{bmatrix}$$

$$U = \begin{Bmatrix} \alpha_{n+1}w_{n+1}F_{n+1}^T \\ \alpha_{n+2}w_{n+2}F_{n+2}^T \\ \alpha_{n+3}w_{n+3}F_{n+3}^T \\ \alpha_{n+4}w_{n+4}F_{n+4}^T \end{Bmatrix}^T,$$

$\omega_i$ is a weighing factor, and $\alpha_{n+i}$ indicates a desired slope of the ZMP.

The weighing factor can be adjusted to restrain the fluctuation of the ZMP trajectories. A region on which the humanoid robot is supported in the double supporting phase is wider than that of the humanoid robot in the single supporting phase. Therefore, the weighing factor in the single supporting phase is larger than that in the double supporting phase in order to compensate a difference between the regions of the double supporting phase and the single supporting phase. In this embodiment, the weighing factor in the single supporting phase is about 100 times of that in the double supporting phase.

Applying the Equation 14 to Lagrnge multiplier, the following Equations 15 and 16 can be obtained:

$$L(\tau, \lambda) = \frac{1}{2}\tau^T W \tau - U\tau + c + \lambda^T(\xi - \Phi_\tau) \quad \text{[Equation 15]}$$

$$\tau = \Phi_W^+ \xi - \Phi_W^+(\Phi W^{-1} U^T) + W^{-1} U^T \quad \text{[Equation 16]}$$

wherein $\Phi_W^+ = W^{-1}\Phi^T(\Phi W^{-1}\Phi^T)^{-1}$.

Solving the Equations 15 and 16, the coefficients of the ZMP position function is obtained in each of the supporting phases.

When the humanoid robot turns, the ZMPs can be the same value of more than three points at the sagital plane successively. In such a case, the abrupt fluctuation of the ZMP trajectories may occur to satisfy the Equation 5.

One method for preventing such an abrupt fluctuation of the ZMP trajectories is to readjust the position of the ZMP. The ZMP can be readjusted to another new ZMP so that the ZMP's are not the same value of more than three points at the sagital plane successively. Therefore, it is possible to prevent the abrupt fluctuation of the ZMP trajectories.

Another method for preventing such an abrupt fluctuation of the ZMP trajectories is to prolong the double supporting time. The abrupt fluctuation of the ZMP trajectories can decrease without affecting the practical walking pattern by prolonging the remainder double supporting time except the initial double supporting time in practical walking. Since the single supporting time is longer than the double supporting time, an effect due to the prolongation of the single supporting time is restrictive. Further, since the abrupt fluctuation of the ZMP trajectories in the single supporting phase is restrained by the weighing factor, an effect due to an adjustment of the supporting time is also restrictive. Since the Equations 3 and 4 representing the CoM position function and the CoM velocity function include the hyperbolic cosine function and the hyperbolic sine function, the ZMP trajectories become very sensitive when the prolongation amount of the supporting time exceeds a predetermined value. In an illustrative embodiment, the prolongation amount of the double supporting time may be less than 1.5 seconds.

The walking pattern in the steady step can be generated by using the steady step module based on the above-described methods. Further, the steady step module can generate various types of the walking patterns by changing the ZMP to arbitrary directions and strides.

The step S103 generates the trajectories of the ZMP and the CoM starting from the stop state by using the transient step module.

The step S105 generates the trajectories of the ZMP and the CoM for a walking end by applying the same transient step module as the step S103 and reversing its sequence.

Figure 5:
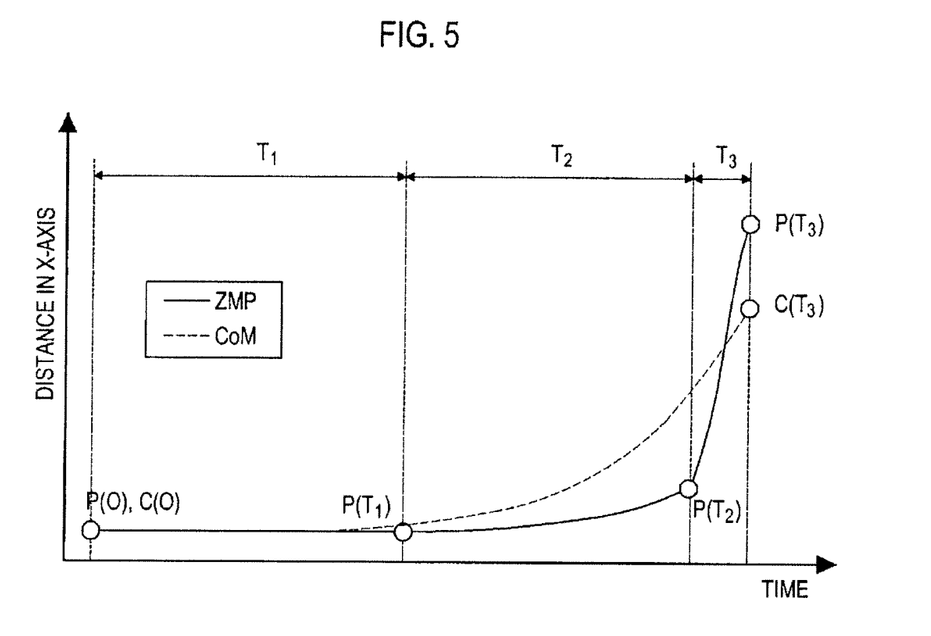
FIG. 5 is a graph showing trajectories of a ZMP and a CoM in a transient step module used in an illustrative embodiment.

FIG. 5 is a graph showing trajectories of the ZMP and the CoM in a transient step module used in one illustrative embodiment.

The transient step module receives the initial value in the initial state of the humanoid robot and a final value obtained from the periodic step module and finds the coefficients of the ZMP position function, thereby generating the trajectories of the ZMP and the CoM in the initial step. On the contrary, the transient step module receives an initial value obtained from the steady step module just before the final step and the final values of the ZMP and CoM determined by user and finds the coefficients of the ZMP position function, thereby generating the trajectories of the ZMP and the CoM in the in the final step. As a result, the walking pattern in the initial step and in the final step is generated by the trajectories of the ZMP and the CoM in the initial step and in the final step, respectively. Three supporting phases are used in the transient step module, and the ZMP position function in each of the supporting phases is represented as a quartic polynomial expression.

The method of generating the walking pattern in the transient step module is equal to the method used in the steady step module. Thus, similarly to the steady step module, it is possible to restrain the fluctuation of the ZMP trajectories in the transient step module by using the weighted least square method or prolonging the double supporting time. To this end, the first supporting time is adjusted during generating the walking pattern in the initial step, whereas the final supporting time is adjusted during generating the walking pattern in the final step. However, the transient step module uses three supporting phases, unlike the steady step module, and the initial and final values of the ZMP and the CoM are predetermined.

The methods of generating the walking pattern in the initial step and the final step are the same except that the generation orders in the walking pattern are reverse, and that the initial value and the final value are different from each other. Since the initial value used in the transient step module indicates the practical initial state of the humanoid robot, it can generate a more practical walking pattern.

Figure 6:
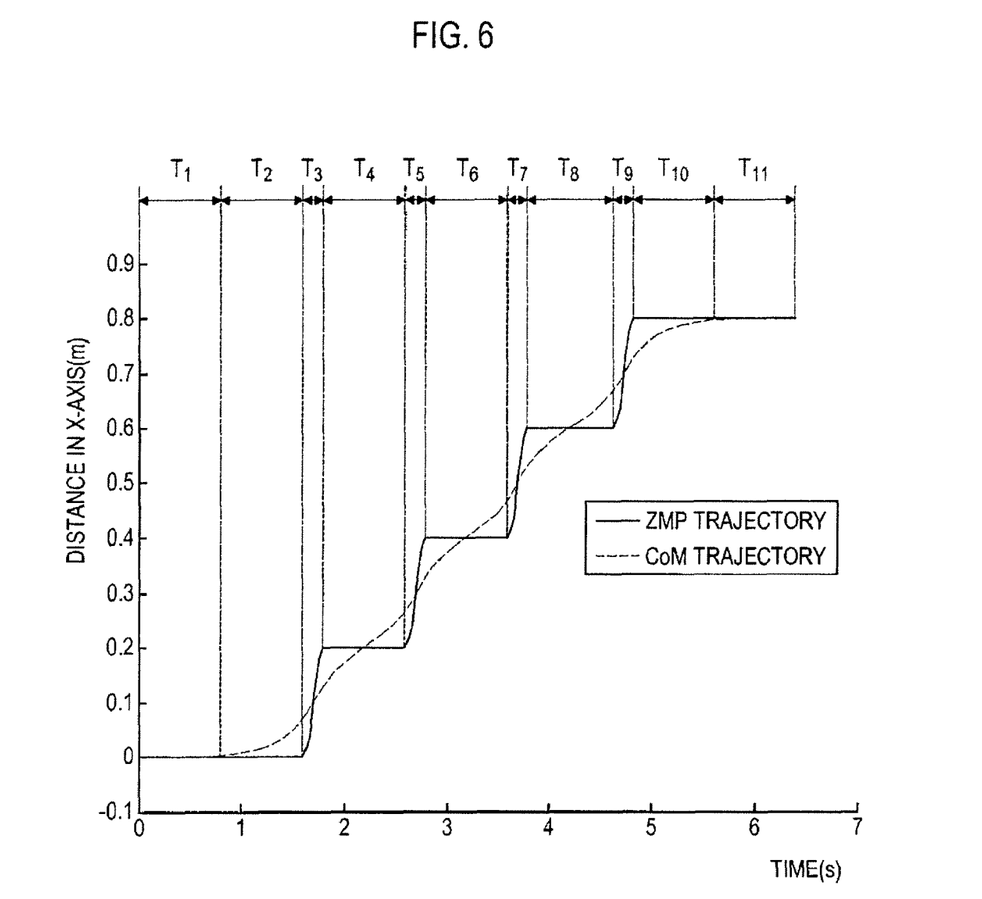
FIG. 6 is a graph showing a X-axis distance of trajectories of a ZMP and a CoM in humanoid robot according to an illustrative embodiment, when a single supporting time Ts is 0.8 seconds, a double supporting time Td is 0.2 seconds, and a stride SW is 0.2 meters.

FIG. 6 is a graph showing an X-axis distance of the trajectories of the ZMP and the CoM for humanoid robot according to one embodiment of the present invention, when a single supporting time Ts is 0.8 seconds, a double supporting time Td is 0.2 seconds, and a stride SW is 0.2 meters. Here, $T_1$, $T_3$, $T_5$, $T_7$, $T_9$ and $T_{11}$ indicate the double supporting time, whereas $T_2$, $T_4$, $T_6$, $T_8$ and $T_{10}$ are the single supporting time.

As shown in FIG. 6, each of $T_1$ to $T_3$ is a time interval indicating the walking pattern of the initial step, to which the transient step module is applied. $T_1$ is a time interval wherein the both feet of the humanoid robot are supported on the ground, $T_2$ indicates a time interval wherein one foot of the humanoid robot is supported on the ground and the other foot moves above the ground, and $T_3$ indicates a time interval wherein the both feet of the humanoid robot are supported on the ground. It generates the ZMP trajectories smoothly and the CoM trajectories during $T_1$ to $T_3$. The ZMP trajectories and the CoM trajectories have a nonminimum phase characteristic to generate the trajectories in an undesired direction initially. At this time, an illustrative embodiment can smoothly generate the ZMP trajectories and the CoM trajectories by using the proposed methods. A transient response characteristic in a system may be remarkably changed according to an unstable zero of the function. When the zero of the characteristic equation of the system exists on the left half plane, it is called "a minimum phase system." When the zero of the characteristic equation of the system exists on the right half plane, it is called "a nonminimum phase system."

Each of $T_4$ to $T_8$ is a time interval indicating the trajectories of the ZMP and the CoM in the steady step, to which the steady step module is applied. $T_4$ indicates a time interval wherein one foot of the humanoid robot is supported on the ground and the other foot thereof moves above the ground. In this case, the ZMP trajectories maintain a uniform value, while the CoM trajectories vary along the curve. $T_5$ indicates a time interval wherein the both feet of the humanoid robot are supported on the ground. In this case, the ZMP trajectories and the CoM trajectories vary along each curve. In this embodiment, since the moving direction of the humanoid robot does not change and each of the supporting times is the same, the ZMP trajectories and the CoM trajectories in $T_6$ and $T_8$ are equal to those in $T_4$, and the ZMP trajectories and the CoM trajectories in $T_7$ are equal to those in $T_5$. However, the present invention is not limited to thereto. It is possible to generate the various walking patterns according to the arbitrary ZMP.

$T_9$ to $T_{11}$ are time intervals indicating the trajectories of the ZMP and the CoM in the final step, to which the transient step module is applied. The ZMP trajectories and the CoM trajectories at $T_9$, $T_{10}$ and $T_{11}$ correspond to those at $T_3$, $T_2$ and $T_1$ in the initial step. Thus, the detailed descriptions thereof will be omitted herein.

Between the step S103 and the step S105, the method of generating a walking pattern for a humanoid robot 100 according to one embodiment of the present invention further comprises judging whether walking of the humanoid robot is the final step or not (step S107, not shown).

The method of generating a walking pattern for a humanoid robot 100 according to one embodiment can increase the stride by moving the ZMP in the single supporting phase.

Figure 7:
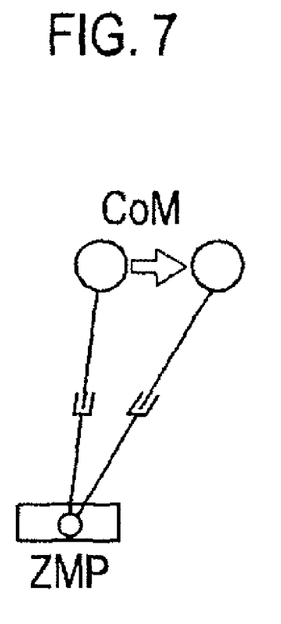
FIGS. 7 and 8 conceptional views for explaining a movement of the ZMP in a single supporting phase.
Figure 8:
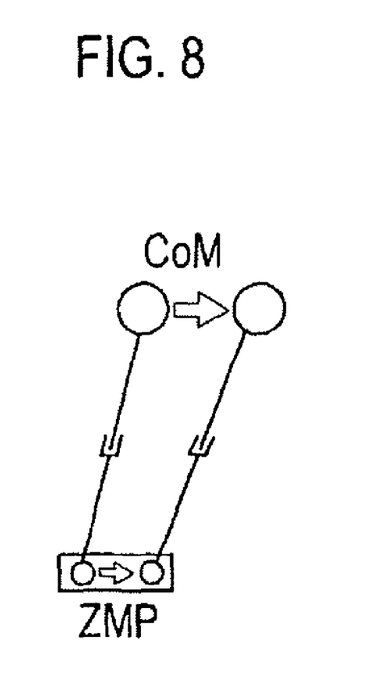

FIG. 7 shows a displacement of the CoM when the ZMP is fixed in the single supporting phase. FIG. 8 shows a displacement of the CoM when the ZMP is variable in the single supporting phase.

As shown in FIGS. 7 and 8, the displacement of the CoM for moving the CoM equally when the ZMP is variable in the single supporting phase decreases when compared to the fixed ZMP. The humanoid robot has motors for actuating its each joint and a maximum angular velocity of the motors is generally predetermined. Herein, each joint of the humanoid robot can be actuated through the CoM displacement represented as a point mass. The angular velocity of the motor decreases along with the decrease of the CoM displacement during the same time interval. Meanwhile, when the ZMP is variable, the CoM displacement further increases for the same time interval at the same angular velocity. Therefore, the stride of the humanoid robot can increase when the ZMP is variable.

Some embodiments may provide a method of generating a walking pattern for a humanoid robot. The method of generating a walking pattern for a humanoid robot can obtain a simple dynamic Equation by using the inverted pendulum model. Therefore, time spent on generating the walking pattern can be shortened due to the decrease in an amount of the calculation. The walking pattern for a humanoid robot can be generated in an omnidirection and with different strides by varying the next ZMP applicable to the steady step module. Further, to satisfy the periodic characteristic and the continuity in the ZMP and the CoM in each of the supporting phases, the fluctuation of the ZMP can be restrained effectively by employing the weighted least square method and adjusting the weighing factor. Therefore, the humanoid robot can walk stably and smoothly. Moreover, the maximum stride can increase by moving the ZMP in the single supporting phase.

The method of generating a walking pattern for a humanoid robot may be provided. The method of generating a walking pattern for a humanoid robot may comprise: determining a position of a next ZMP along a moving direction of the humanoid robot; obtaining a first condition for generating a walking pattern based on the determined ZMP by using a periodic step module; generating trajectories of a ZMP and a CoM in an initial step based on the first condition and an initial value obtained from an initial state of the humanoid robot by using a transient step module; generating trajectories of a ZMP and a CoM in a steady step based on ZMPs of two steps by using a steady step module; and generating trajectories of a ZMP and a CoM in a final step by using the transient step module.

The relationship between the ZMP and the CoM used in each of the step modules is based on the following Equation:

$$X_i = A_i X_{i-1} + B_i \beta_i$$

wherein $$X_i = \begin{Bmatrix} w(c(T_i) - p(T_i)) \\ \dot{c}(T_i) \end{Bmatrix}$$

$$A_i = \begin{bmatrix} CT_i & ST_i \\ ST_i & CT_i \end{bmatrix}$$

$$B_i = \begin{bmatrix} -\frac{24}{\omega^3}CT_i + \frac{12}{\omega}T_i^2 + \frac{24}{\omega^3} & -\frac{24}{\omega^2}ST_i + 4T_i^3 + \frac{24}{\omega^3}T_i \\ -\frac{6}{\omega^2}ST_i + \frac{6}{\omega}T_i & -\frac{6}{\omega^3}CT_i + 3T_i^2 + \frac{6}{\omega^2} \\ -\frac{2}{\omega}CT_i + \frac{2}{\omega} & -\frac{2}{\omega}ST_i + 2T_i \\ -ST_i & -CT_i + 1 \end{bmatrix}^T$$

$$\beta_i = (b_{i4} \quad b_{i3} \quad b_{i2} \quad b_{i1})^T,$$

$T_i$ is an i-th supporting time,
$p(T_i)$ is a ZMP position function at $T_i$,
$c(T_i)$ and $\dot{c}(T_i)$ are a CoM position function and a CoM velocity function at $T_i$, respectively,
$CT_i$ and $ST_i$ indicate $\cos h\omega T_i$, $\sin h\omega T_i$, respectively, and
$b_{in}(n=1, \ldots, 4)$ indicates an n-th coefficient of the ZMP position function at an i-th supporting phase.

When generating the walking pattern, each of the step modules uses a periodic characteristic represented by following Equation:

$$\omega(c(T_{n+4}) - p(T_{n+4})) = \omega(c(T_n) - p(T_n)),$$

$$\dot{c}(T_{n+4}) = \dot{c}(T_n)$$

wherein $T_n$ denotes an initial supporting time and $T_{n+1}$ denotes a final supporting time.

The periodic step module uses two single supporting phases and two double supporting phases, whereas the steady step module uses two single supporting phases and two double supporting phases. Further, the transient step module uses one single supporting phase and two double supporting phases.

Preferably, the periodic step module uses an analytic method so as to satisfy the periodic characteristic in the ZMP and the continuity of the ZMP and the CoM among the supporting phases.

Preferably, the steady step module uses a weighted least square method so as to optimize a second condition that satisfies the periodic characteristic and the continuity in the ZMP and the CoM among each of the supporting phases. More preferably, a weighing factor in the single supporting phase is more than that in the double supporting phase so as to restrain a fluctuation in ZMP trajectories. Further, when the ZMPs are the same value of more than three points at the sagital plane successively, the fluctuation in the ZMP trajectories are restrained by readjusting the ZMP, and the fluctuation in the ZMP trajectories are restrained by increasing a double supporting time.

Preferably, the transient step module uses a weighted least square method so as to optimize a second condition that satisfies the periodic characteristic and the continuity in the ZMP and the CoM among each of the supporting phases. More preferably, a weighing factor in the single supporting phase is more than that in the double supporting phase so as to restrain a fluctuation in ZMP trajectories. Further, when the ZMPs are the same value of more than three points at the sagital plane successively, the fluctuation in the ZMP trajectories are restrained by readjusting the ZMP, and the fluctuation in the ZMP trajectories are restrained by increasing a double supporting time.

Preferably, a stride increases by moving the ZMP in the single supporting phase

Any reference in this specification to "one embodiment," "an embodiment," "example embodiment," etc., means that a particular feature, structure or characteristic described in connection with the embodiment is included in at least one embodiment of the present invention. The appearances of such phrases in various places in the specification are not necessarily all referring to the same embodiment. Further, when a particular feature, structure or characteristic is described in connection with any embodiment, it is submitted that it is within the purview of one skilled in the art to affect such feature, structure or characteristic in connection with other ones of the embodiments.

Although embodiments have been described with reference to a number of illustrative embodiments thereof, it should be understood that various other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for generating a walking pattern in a humanoid robot, comprising:
    determining a position of a next Zero Moment Point (ZMP) along a moving direction of the humanoid robot;
    obtaining a first condition for generating a walking pattern based on the determined ZMP by using a periodic step module;
    generating trajectories of a ZMP and a Center of Mass (CoM) in an initial step based on the first condition and an initial value obtained from an initial state of the humanoid robot by using a transient step module;
    generating trajectories of a ZMP and a CoM in a steady step based on two ZMPs by using a steady step module; and
    generating trajectories of a ZMP and a CoM in a final step by using the transient step module.

2. The method of claim 1, wherein a relation between the ZMP and the CoM used in each of the step modules is based on the following Equation:

$$X_i = A_i X_{i-1} + B_i \beta_i,$$

wherein $$X_i = \left\{ \begin{array}{c} \omega(c(T_i) - p(T_i)) \\ \dot{c}(T_i) \end{array} \right\}$$

$$A_i = \begin{bmatrix} CT_i & ST_i \\ ST_i & CT_i \end{bmatrix}$$

$$B_i = \begin{bmatrix} -\frac{24}{\omega^2}CT_i + \frac{12}{\omega}T_i^2 + \frac{24}{\omega^3} & -\frac{24}{\omega^2}ST_i + 4T_i^3 + \frac{24}{\omega^2}T_i \\ -\frac{6}{\omega^3}ST_i + \frac{6}{\omega}T_i & -\frac{6}{\omega^3}CT_i + 3T_i^2 + \frac{6}{\omega^3} \\ -\frac{2}{\omega}CT_i + \frac{2}{\omega} & -\frac{2}{\omega}ST_i + 2T_i \\ -ST_i & -CT_i + 1 \end{bmatrix}^T$$

$$\beta_i = (b_{i4} \quad b_{i3} \quad b_{i2} \quad b_{i1})^T,$$

$T_i$ is an i-th supporting time,
$p(T_i)$ is a ZMP position function at $T_i$,
$c(T_i)$ and $\dot{c}(T_i)$ are a CoM position function and a CoM velocity function at $T_i$, respectively,
$CT_i$ and $ST_i$ indicate $\cos h\omega T_i$, $\sin h\omega T_i$, respectively, and
$b_{in}(n=1, \ldots, 4)$ indicates an n-th coefficient of the ZMP position function at an i-th supporting phase.

3. The method of claim 1, wherein when generating the walking pattern, each of step modules uses a periodic characteristic represented by the following Equation:

$$\omega(c(T_{n+4}) - p(T_{n+4})) = \omega(c(T_4) - p(T_n)),$$

$$\dot{c}(T_{n+4}) = \dot{c}(T_n)$$

wherein $T_n$ denotes an initial supporting time and $T_{n+1}$ denotes a final supporting time.

4. The method of claim 1, wherein the periodic step module uses two single supporting phases and two double supporting phases.

5. The method of claim 2, wherein the periodic step module uses two single supporting phases and two double supporting phases.

6. The method of claim 3, wherein the periodic step module uses two single supporting phases and two double supporting phases.

7. The method of claim 6, wherein the periodic step module uses an analytic method so as to satisfy the periodic characteristic in the ZMP and the continuity of the ZMP and the CoM among the single and double supporting phases.

8. The method of claim 1, wherein the steady step module uses two single supporting phases and two double supporting phases.

9. The method of claim 2, wherein the steady step module uses two single supporting phases and two double supporting phases.

10. The method of claim 3, wherein the steady step module uses two single supporting phases and two double supporting phases.

11. The method of claim 10, wherein the steady step module uses a weighted least square method so as to optimize a second condition that satisfies the periodic characteristic and the continuity in the ZMP and the CoM among each of the single and double supporting phases.

12. The method of claim 11, wherein a weighing factor in the single supporting phase is more than that in the double supporting phase so as to restrain a fluctuation in ZMP trajectories.

13. The method of claim 11, wherein when the ZMPs are the same value of more than three points at the sagital plane successively, the fluctuation in the ZMP trajectories are restrained by readjusting the ZMP.

14. The method of claim 11, wherein when the ZMPs are the same value of more than three points at the sagital plane successively, the fluctuation in the ZMP trajectories are restrained by increasing a double supporting time.

15. The method of claim 1, wherein the transient step module uses one single supporting phase and two double supporting phases.

16. The method of claim 2, wherein the transient step module uses one single supporting phase and two double supporting phases.

17. The method of claim 3, wherein the transient step module uses one single supporting phase and two double supporting phases.

18. The method of claim 17, wherein the transient step module uses a weighted least square method so as to optimize a second condition that satisfies the periodic characteristic and the continuity in the ZMP and the CoM among each of the single and double supporting phases.

19. The method of claim 18, wherein a weighing factor in the single supporting phase is more than that in the double supporting phase so as to restrain a fluctuation in ZMP trajectories.

20. The method of claim 18, wherein when the ZMPs are the same value of more than three points at the sagital plane successively, the fluctuation in the ZMP trajectories are restrained by readjusting the ZMP.

21. The method of claim 18, wherein when the ZMPs are the same value of more than three points at the sagital plane successively, the fluctuation in the ZMP trajectories are restrained by increasing a double supporting time.

22. The method of claim 1, wherein a stride increases by moving the ZMP in the single supporting phase.

* * * * *